United States Patent
Gholap et al.

(10) Patent No.: US 10,453,195 B2
(45) Date of Patent: Oct. 22, 2019

(54) METHOD OF DETECTING TISSUE AREA OF INTEREST IN DIGITAL PATHOLOGY IMAGING BY EXECUTING COMPUTER-EXECUTABLE INSTRUCTIONS STORED ON A NON-TRANSITORY COMPUTER-READABLE MEDIUM

(71) Applicant: OptraScan, Inc., Cupertino, CA (US)

(72) Inventors: Abhijeet Gholap, Cupertino, CA (US); Anagha Jadhav, Sunnyvale, CA (US); Isha Doshi, Sunnyvale, CA (US); Gurunath Kamble, Sunnyvale, CA (US)

(73) Assignee: OptraScan, Inc., Cupertino, CA (US)

( * ) Notice: Subject to any disclaimer, the term of this patent is extended or adjusted under 35 U.S.C. 154(b) by 130 days.

(21) Appl. No.: 15/681,033

(22) Filed: Aug. 18, 2017

(65) Prior Publication Data

US 2018/0053299 A1    Feb. 22, 2018

Related U.S. Application Data

(60) Provisional application No. 62/376,988, filed on Aug. 19, 2016.

(51) Int. Cl.
*G06T 7/00* (2017.01)
*G06T 5/40* (2006.01)
(Continued)

(52) U.S. Cl.
CPC .......... *G06T 7/0014* (2013.01); *G02B 21/365* (2013.01); *G06K 9/0014* (2013.01); *G06K 9/38* (2013.01); *G06K 9/40* (2013.01); *G06K 9/6212* (2013.01); *G06K 9/6267* (2013.01); *G06T 5/007* (2013.01); *G06T 5/40* (2013.01);
(Continued)

(58) Field of Classification Search
None
See application file for complete search history.

(56) References Cited

U.S. PATENT DOCUMENTS 7,869,641 B2   1/2011   Wetzel et al.
2006/0014238 A1*  1/2006   Gholap .............. G01N 33/5091
                                                      435/40.5
(Continued)

FOREIGN PATENT DOCUMENTS

WO   WO-2016120463 A1 *   8/2016   ......... G06K 9/00127

OTHER PUBLICATIONS

US 8,565,553 B2, 10/2013, Tatke et al. (withdrawn)

*Primary Examiner* — Vu Le
*Assistant Examiner* — Tracy Mangialaschi

(57) ABSTRACT

A tissue area detection method in digital pathology imaging uses an automated method to detect tissue area of interest (AOI detection) on a Whole Slide Analysis (WSA) or Tissue Micro Array (TMA) thumbnail image. The present method may use preprocessing of the image followed by a two-pass segmentation technique for separating tissue areas from non-tissue areas. The present method may further use global and local window statistics for thresholding to overcome variations in staining intensity that may hamper accurate selection of the area of interest. The present method may also have a classifying process of the tissue area based on the staining method used and applying stain specific filters to remove unwanted artifacts.

15 Claims, 14 Drawing Sheets

(51) Int. Cl.
*G06K 9/62* (2006.01)
*G06K 9/40* (2006.01)
*G06T 7/136* (2017.01)
*G06T 7/11* (2017.01)
*G06T 7/155* (2017.01)
*G06T 7/194* (2017.01)
*G06T 7/90* (2017.01)
*G02B 21/36* (2006.01)
*G06T 5/00* (2006.01)
*G06K 9/00* (2006.01)
*G06K 9/38* (2006.01)

(52) U.S. Cl.
CPC ............... *G06T 7/11* (2017.01); *G06T 7/136* (2017.01); *G06T 7/155* (2017.01); *G06T 7/194* (2017.01); *G06T 7/90* (2017.01); *G06T 2200/24* (2013.01); *G06T 2207/10024* (2013.01); *G06T 2207/10056* (2013.01); *G06T 2207/30024* (2013.01); *G06T 2207/30072* (2013.01)

(56) References Cited

U.S. PATENT DOCUMENTS

| | | | |
|---|---|---|---|
| 2006/0015262 A1* | 1/2006 | Gholap | G06K 9/00127 702/19 |
| 2006/0045320 A1* | 3/2006 | Wetzel | G06K 9/00127 382/128 |
| 2012/0076391 A1* | 3/2012 | Dietz | G02B 21/367 382/133 |
| 2018/0012355 A1* | 1/2018 | Sarkar | G06K 9/00127 |

\* cited by examiner

METHOD OF DETECTING TISSUE AREA OF INTEREST IN DIGITAL PATHOLOGY IMAGING BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 62/376,988 filed on Aug. 19, 2016.

FIELD OF THE INVENTION

The present invention relates generally to digital pathology. More particularly, the present invention relates to a method for detecting tissue areas of interest from a slide.

BACKGROUND OF THE INVENTION

Microscopic examination of stained and processed tissue is the cornerstone of disease diagnosis in the field of histopathology. For the purpose of diagnosis, the biopsied or resected tissues obtained by surgical procedures are processed, stained, mounted on glass slides and viewed under microscopes, conventionally. By automating this process, digital pathology adds the much-needed speed and accuracy to the conventional method of glass slide based histopathology.

Digital pathology is a process of converting glass microscopy slides into high-resolution digital images. These images can be viewed, managed, analyzed and interpreted with a computer-based digital pathology work flow management system, instead of a microscope. Digital pathology converts the conventional glass slide based process into a dynamic digital image based one. This process allows faster and more accurate analysis and reporting, easy archival and retrieval of stored images and metadata, and facilitates transfer of digitized slides over shared networks for consultations, second opinions, education and quality control.

For the scanning process to be efficient in terms of speed and storage space, the tissue on the glass slide needs to be accurately identified and differentiated from area on the glass slide not covered by tissue. The identification of this tissue area is also described as detection of AOI or area of interest. A thumbnail image of the slide generated by a low-resolution camera is used for the detection of the area of interest. Automated detection of the AOI in the thumbnail image can be performed using different techniques.

Prior arts detailed as follows exist for thumbnail area of interest (AOI) detection methods:

U.S. Pat. No. 8,565,553 describes a method for thumbnail AOI (area of interest) detection through image segmentation technique based on threshold values and additional parameters derived from empirical data.

U.S. Pat. No. 7,869,641 describes a system and method for finding regions of interest for microscopic digital montage imaging using a standard microscope and a camera.

However, there remains a need for an algorithm that addresses the following issues:

Detection of the foreground (tissue) pixels from the background pixels even when the thumbnail image has uneven illumination.

Detection of tissue areas even when the staining intensity is not optimum.

Detection of tissue areas stained by various staining methods applying appropriate stain specific artifact filters.

The present invention based on segmentation techniques seeks to address all these issues.

DETAIL DESCRIPTIONS OF THE INVENTION

Figure 1:
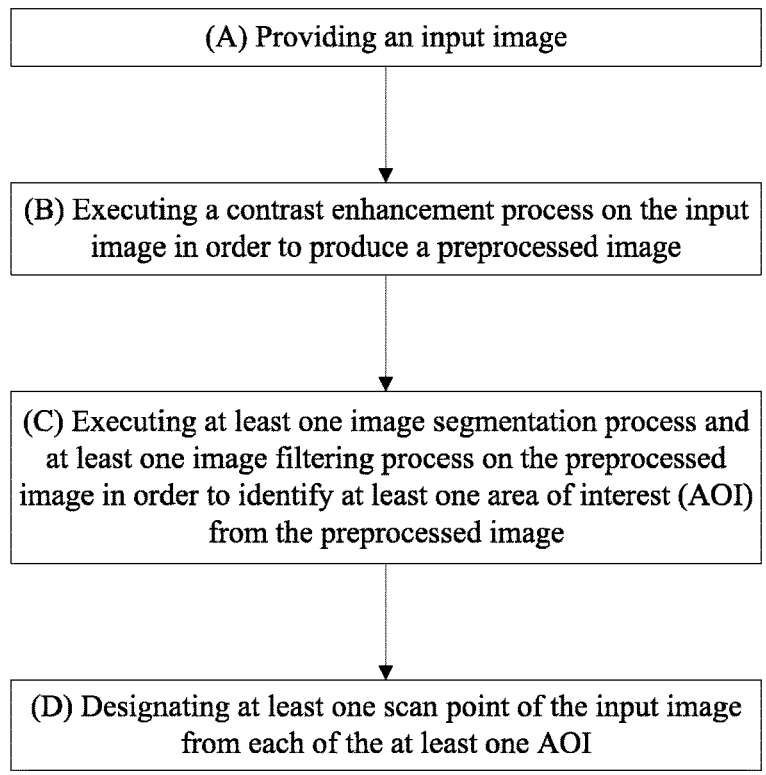
FIG. 1 is a stepwise flow diagram illustrating the general steps in the method of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention.

The present invention is a method for analyzing images of specimen slides in order to identify areas of interest in the image in order to facilitate faster and more accurate analysis and reporting of specimen slides, in addition to easy archival and retrieval of stored images and metadata in order to add to the speed and accuracy of histopathology.

According to one disclosed embodiment, a tissue detection method for selecting area of interest in tissue micro array (TMA) or whole slide scanning analysis (WSA) may comprise an area of interest detection algorithm based on image segmentation techniques, that detects the tissue area from a thumbnail image of the slide using global as well as local (moving window based) statistics of the image. In one embodiment, the algorithm reduces the possibility of background pixels being segmented as tissue area pixels due to uneven illumination. In another embodiment, the method of invention classifies the thumbnail image according to the staining method used (hematoxylin and eosin staining, or immunohistochemical staining, or other staining method) based on color properties of the stain and applies appropriate artifact filters for the given stain.

A central component of the digital pathology set up is the image acquisition or scanning device, which scans the glass slide and converts it into a digital image. This acquisition of images can be carried out by means of digital cameras mounted on microscopes, by automated microscopes and by digital slide scanners.

In the case of digital slide scanners, individual images of each frame are acquired with a camera under different resolutions and these images are then stitched together to form a complete image. The huge size of these whole slide images calls for processes that will accurately select the tissue areas of interest for scanning and remove unwanted non-tissue areas. A glass slide measuring approximately 3"×1" typically is used for preparing histopathology slides, while the average histopathology tissue may measure 15×15 mm in dimensions or less. This should, however not be considered as a limitation, as the present invention could be used on slides/tissues of varying dimensions in any desired manner. It is important that the tissue area on the glass slide be selected accurately and clearly differentiated from the non-tissue area. If the tissue area is not chosen correctly for scanning, the entire area of the glass slide will be scanned, thus increasing the total time needed for scanning, size and hence storage requirements of the digital image, and generating unwanted data that is of no use in tissue diagnosis.

Hence, in the digital pathology process, to begin with, a thumbnail camera incorporated in the scanner captures a low-resolution image of the entire glass slide with the tissue. This thumbnail image is used to detect the tissue area or the "Area of interest" (AOI) on the glass slide. Once the area of interest is detected correctly, the scanner exclusively scans this tissue region, thus saving the total scanning time and storage space required for saving the digital image. The area of interest can be selected from the thumbnail image either manually or by automated means with the help of tissue detection algorithms. Automating this process increases the speed and efficiency of the scanning process. However, automated tissue detection is further made difficult by unwanted artifacts like air bubbles, marker pen ink, etc. that may be mistaken for tissue by the algorithm. Similarly, variations in the staining method used and irregularities in staining intensity can also obstruct the algorithm from accurately choosing the tissue area of interest. Variations in illumination can further hamper accurate tissue detection by the algorithm. The present invention describes a method for area of interest detection from a thumbnail image, that surpasses all the hurdles mentioned above and effects accurate automated AOI detection irrespective of variables like staining method, staining intensity, illumination and presence of artifacts.

In general, as illustrated in FIG. 1, according to one embodiment of the method of the present invention, an input image is provided. Said input image may be understood to be the thumbnail image referenced above, or any other relevant type, format, or source of image. Subsequently, a contrast enhancement process is executed on the input image in order to produce a preprocessed image. Then, at least one segmentation process and at least one image filtering process are executed on the preprocessed image in order to identify at least one area of interest (AOI) from the preprocessed image. At least one scan point is then designated from each of the at least one AOI.

Figure 2:
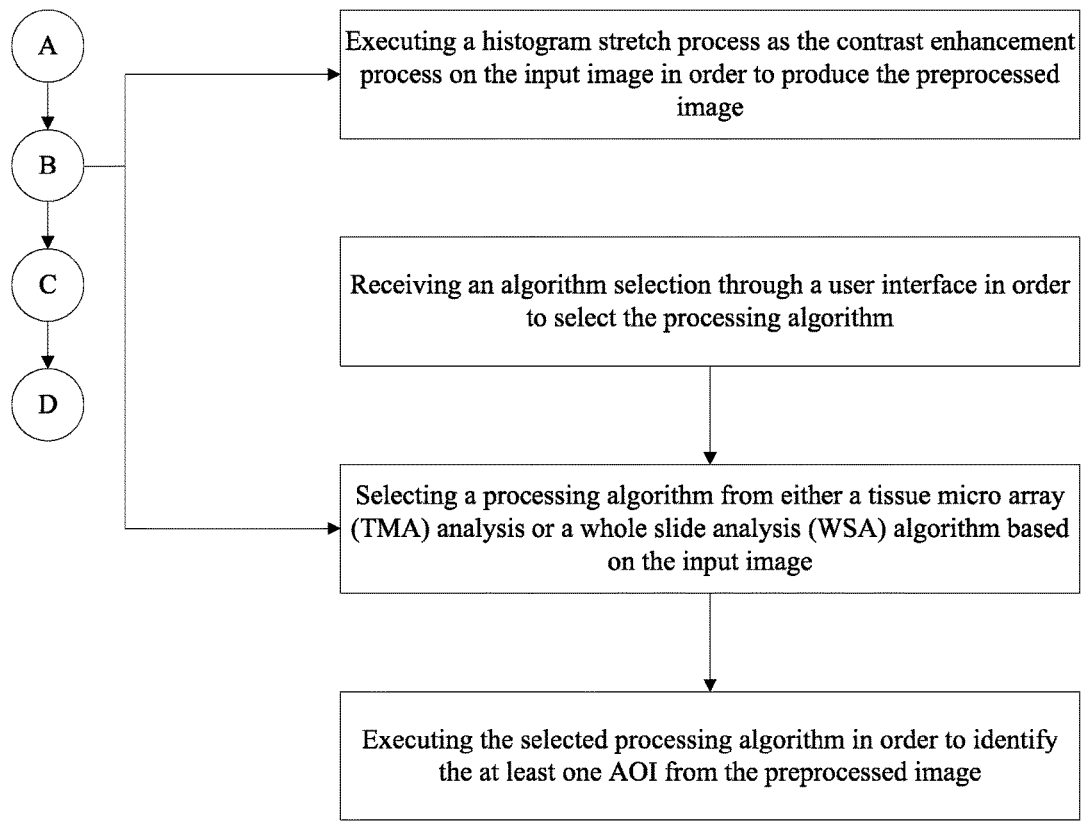
FIG. 2 is a stepwise flow diagram illustrating steps for preprocessing an input image and selecting a processing algorithm.

More specific techniques for analyzing the input image may depend on the type of arrangement of the specific specimen slide in question. Thus, as illustrated in FIG. 2, a processing algorithm is selected from one of: a tissue micro array (TMA) analysis algorithm, or a whole slide analysis (WSA) algorithm, based on the input image. In some embodiments, the processing algorithm may be selected manually through input from a user. Thus, an algorithm selection may be received through a user interface in order to select the processing algorithm. In some embodiments, the processing algorithm may be selected automatically by digital analysis techniques herein undisclosed. The selected processing algorithm is then executed in order to identify the at least one AOI.

Figure 3:
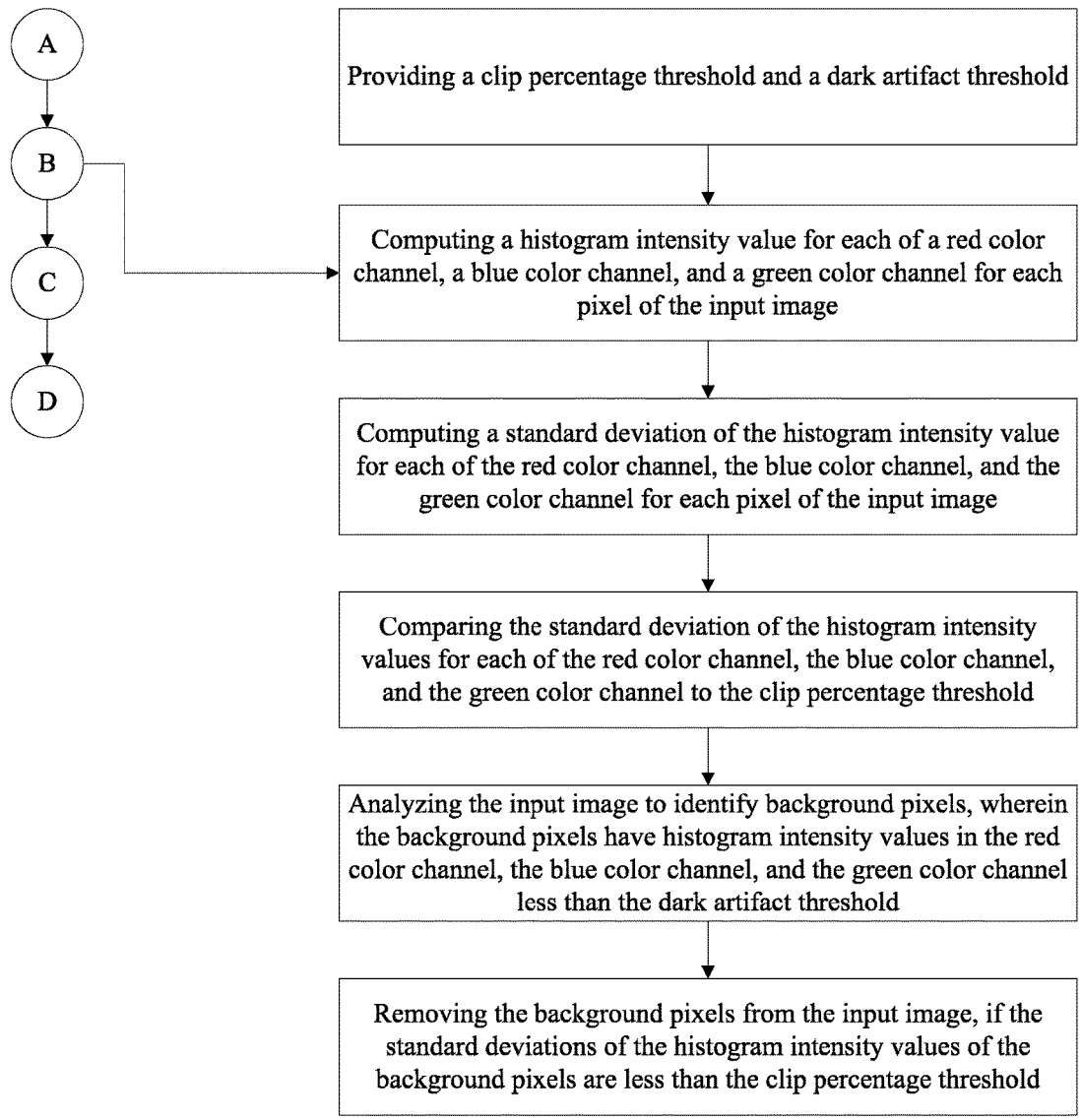
FIG. 3 is a stepwise flow diagram illustrating steps for removing background pixels from the input image.

In some embodiments, as illustrated in FIG. 3, the contrast enhancement process is executed as a histogram stretch process on the input image in order to produce the preprocessed image. More specifically, a clip percentage threshold and a dark artifact threshold are provided in the software. A histogram intensity is then computed for each of a red color channel, a blue color channel, and a green color channel for each pixel of the input image. A standard deviation of the histogram intensity value is computer for each of the red color channel, the blue color channel, and the green color channel for each pixel of the input image. The standard deviation of the histogram intensity values for each of the red color channel, the blue color channel, and the green color channel are compared to the clip percentage threshold. The input image is analyzed to identify background pixels, wherein the background pixels have histogram intensity values in the red color channel, the blue color channel, and the green color channel less than the dark artifact threshold. The background pixels are removed from the input image if the standard deviations of the histogram intensity values of the background pixels are less than the clip percentage threshold.

Figure 4:
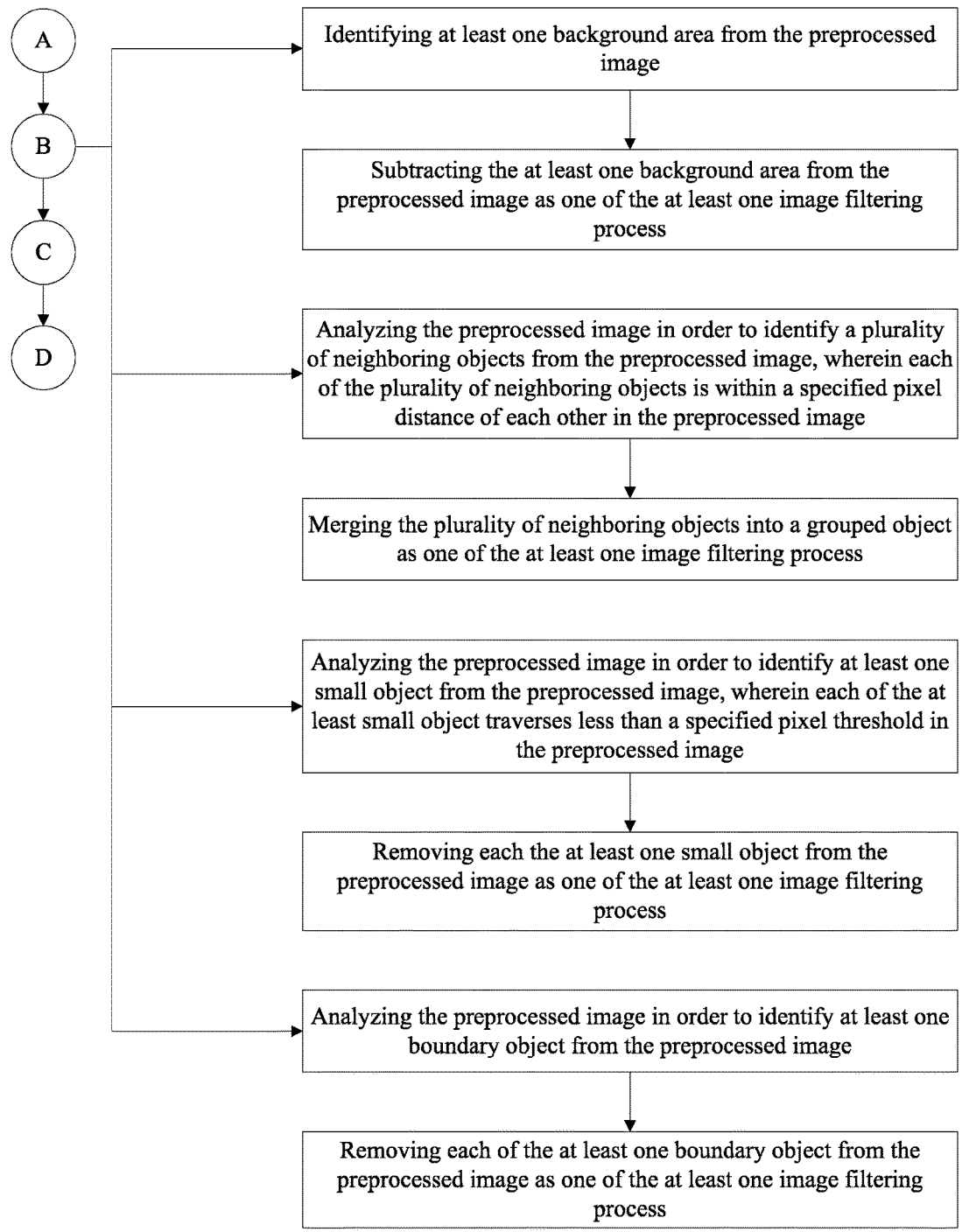
FIG. 4 is a stepwise flow diagram illustrating steps for applying various image filtering processes to the input image.

Referring to FIG. 4, the at least one image filtering process may comprise various techniques to eliminate regions that are not AOIs. For example, in some embodiments at least one background area may be identified from the preprocessed image, and the at least one background area is subtracted from the preprocessed image as one of the at least one image filtering process.

In some embodiments, the preprocessed image may be analyzed in order to identify a plurality of neighboring objects from the preprocessed image, wherein each of the plurality of neighboring objects is within a specified pixel distance of each other in the preprocessed image, and the plurality of neighboring objects may be merged into a grouped object as one of the at least one image filtering process.

In some embodiments, the preprocessed image may be analyzed in order to identify at least one small object from the preprocessed image, wherein each of the at least one small object traverses less than a specified pixel threshold in the preprocessed image, the specified pixel threshold being predefined in the software. Each of the at least one small object is then removed from the preprocessed image as one of the at least one image filtering process.

In some embodiments, the preprocessed image may be analyzed in order to identify at least one boundary object from the preprocessed image, wherein each of the at least one boundary object is located less than a specified boundary distance from a boundary of the preprocessed image. Each of the at least one boundary object is then removed from the preprocessed image as one of the at least one image filtering process.

Figure 5:
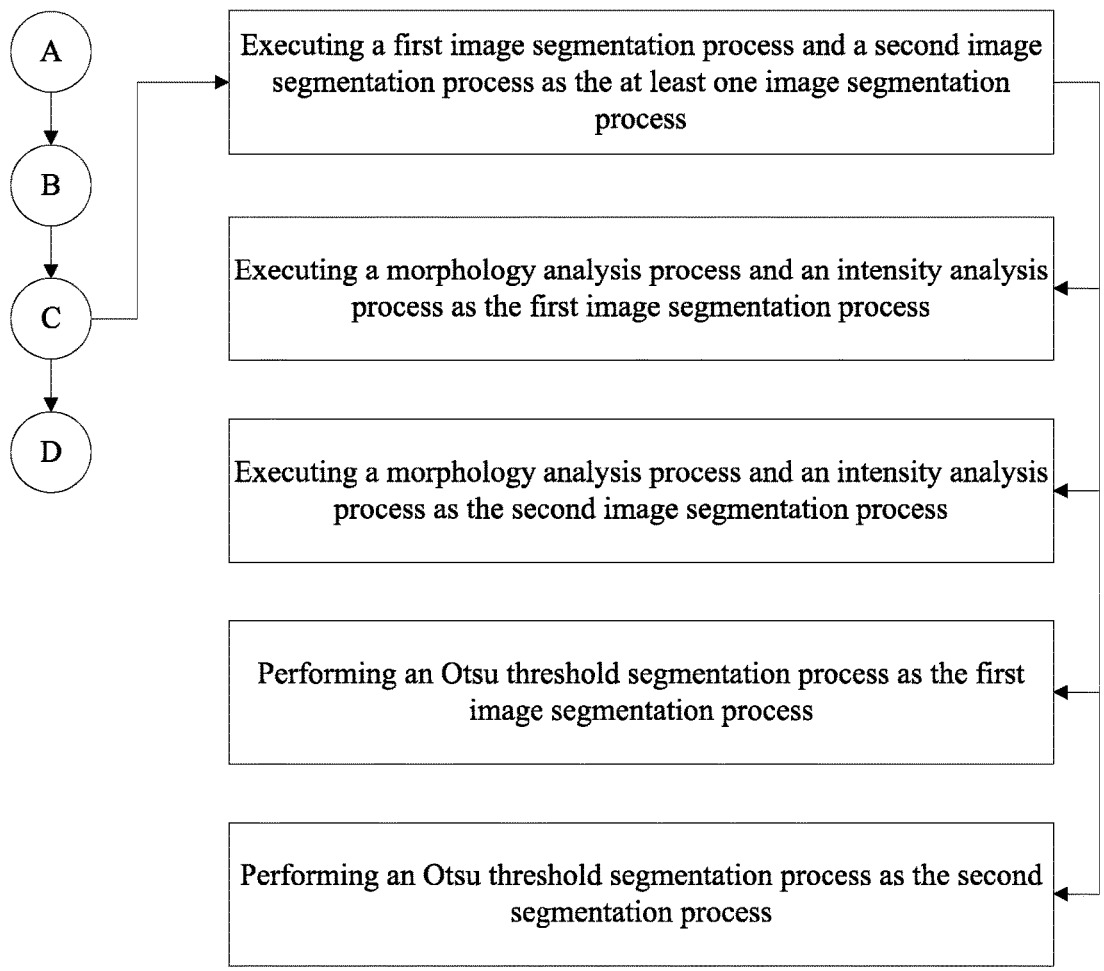
FIG. 5 is a stepwise flow diagram illustrating steps for performing segmentation processes in various embodiments.

In some embodiments, the present invention utilizes two-pass segmentation in order to more precisely identify AOIs from the input image. Thus, referring to FIG. 5, in some embodiments, a first image segmentation process and a second image segmentation process are executed as the at least one image segmentation process. In some embodiments, a morphology analysis process and an intensity analysis process are executed as the first image segmentation process. In some embodiments, the morphology analysis process and intensity analysis process are executed as the second image segmentation process.

In some embodiments, an Otsu threshold segmentation process is executed as the first image segmentation process. In some embodiments, the Otsu threshold segmentation process is executed as the second image segmentation process.

In the preferred embodiment, the first image segmentation process is executed as the morphology analysis process and intensity analysis process, and the second image segmentation process is executed as the Otsu threshold segmentation process. It should be noted that the order in which the segmentation process based on the morphology and analysis process and the segmentation process based on the Otsu threshold method are executed may not be considered to be important or limiting in some embodiments of the present invention.

Figure 6:
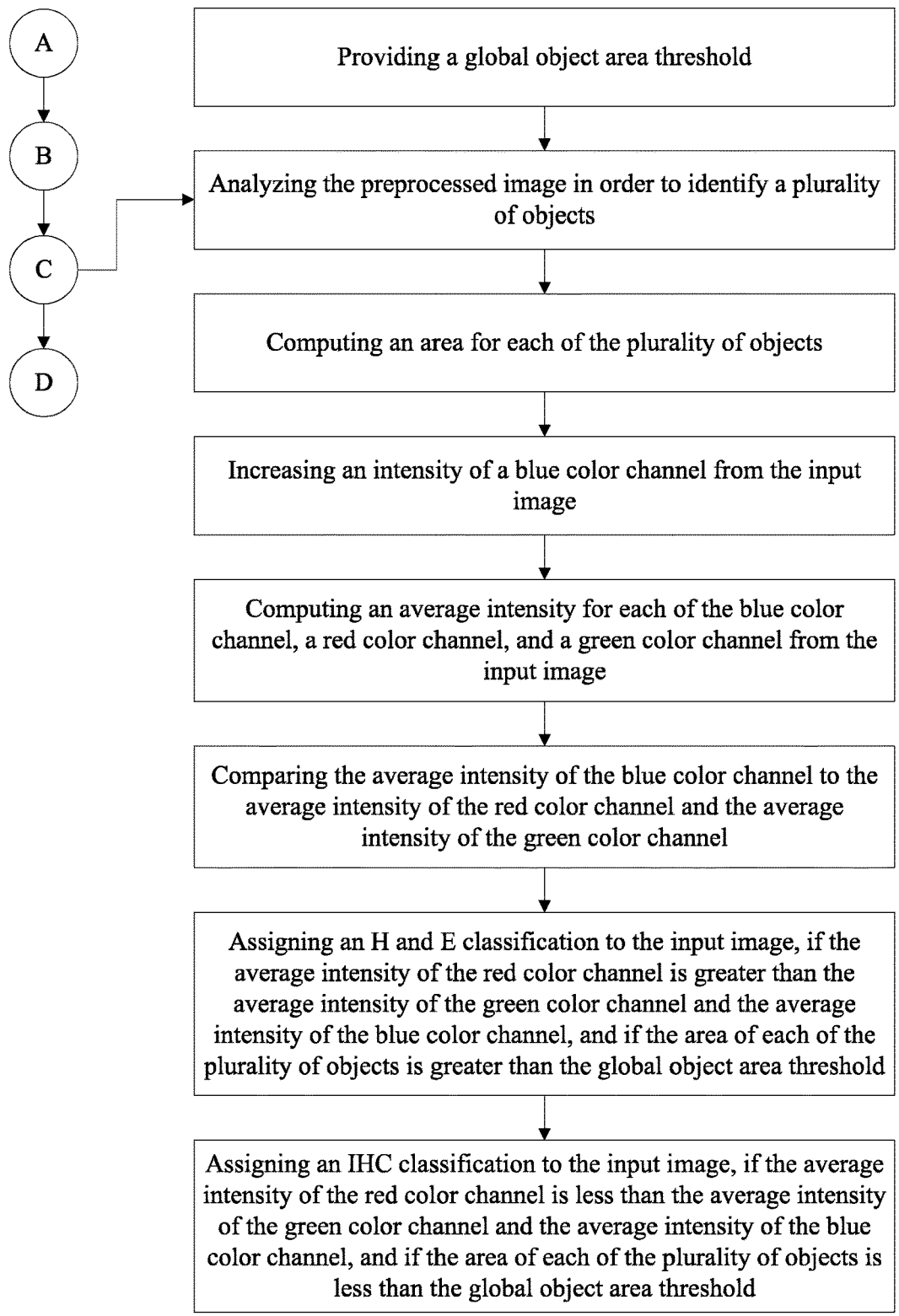
FIG. 6 is a stepwise flow diagram illustrating steps for assigning a stain classification to the image.

In some embodiments, specific process flow in the present invention will depend on classifying the input image according to the specimen staining technique used for the specimen. To this end, referring to FIG. 6, a global object area threshold is provided in the software. The preprocessed image is analyzed in order to identify a plurality of objects, or at least one object. An area is computed for each of the plurality of objects. An intensity of a blue color channel is increased from the input image, and an average intensity is computed for each of the blue color channel, a red color channel, and a green color channel from the input image. The average intensity of the blue color channel is compared to the average intensity of the red color channel and the average intensity of the green color channel.

If the average intensity of the red color channel is greater than the average intensity of the green color channel and the average intensity of the blue color channel, and if the combined area of each of the plurality of objects is greater than the global object area threshold, then a Hematoxylin and Eosin (H and E) classification is assigned to the input image.

If the average intensity of the red color channel is less than the average intensity of the green color channel and the average intensity of the blue color channel, and if the combined area of each of the plurality of objects is less than the global object area threshold, then an immunohistochemistry (IHC) classification is assigned to the input image.

Figure 7:
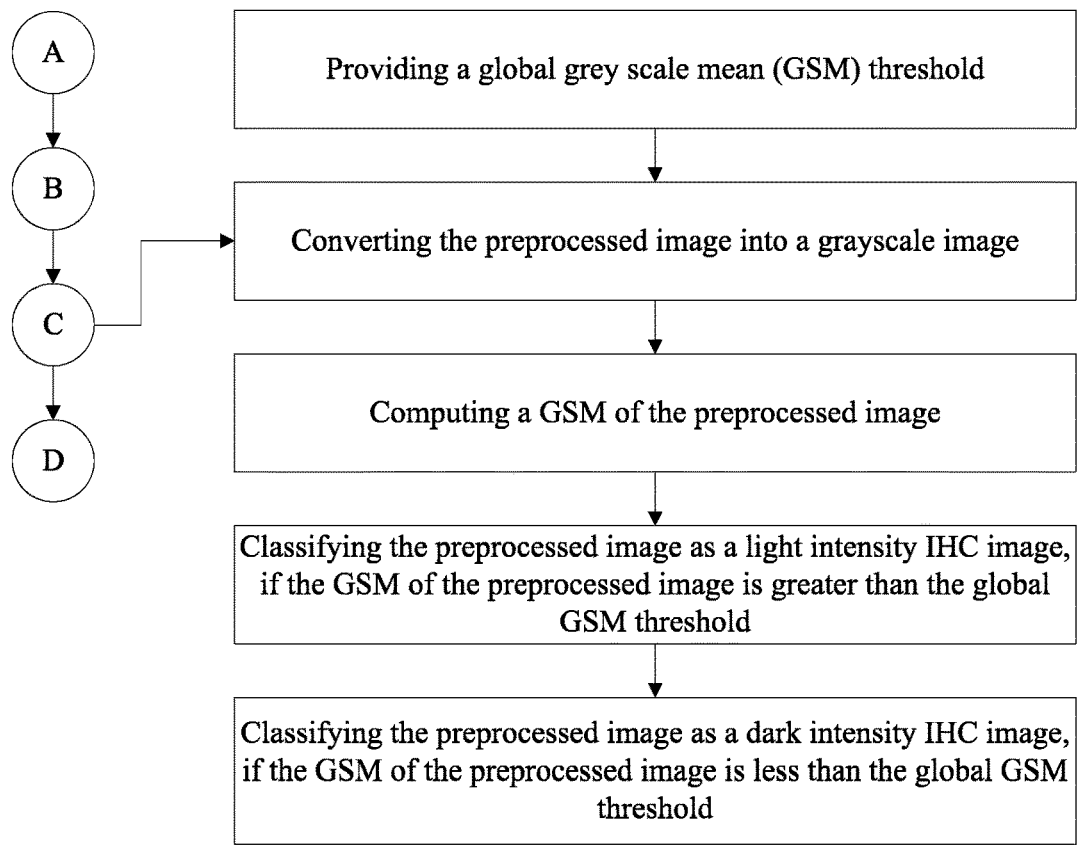
FIG. 7 is a stepwise flow diagram illustrating steps for further classifying an IHC image as either a light intensity or a dark intensity IHC image.

Furthermore, if the IHC classification is assigned to the input image, it is desirable to determine if the input image is a light intensity or dark intensity IHC image. Thus, referring to FIG. 7, a global grey scale mean (GSM) is provided in the software. The preprocessed image is converted into a grayscale image, and a GSM is computed for the grayscaled preprocessed image. If the GSM of the grayscaled preprocessed image is greater than the global GSM threshold, the preprocessed image is classified as a light intensity IHC image. Similarly, if the GSM of the grayscaled preprocessed image is less than the global GSM threshold, the preprocessed image is classified as a dark intensity IHC image.

It should be noted that the aforementioned processes act essentially as building blocks to the process flow of the present invention, the order in which the said processes are executed in the preferred embodiment of the present invention follows below.

Figure 8:
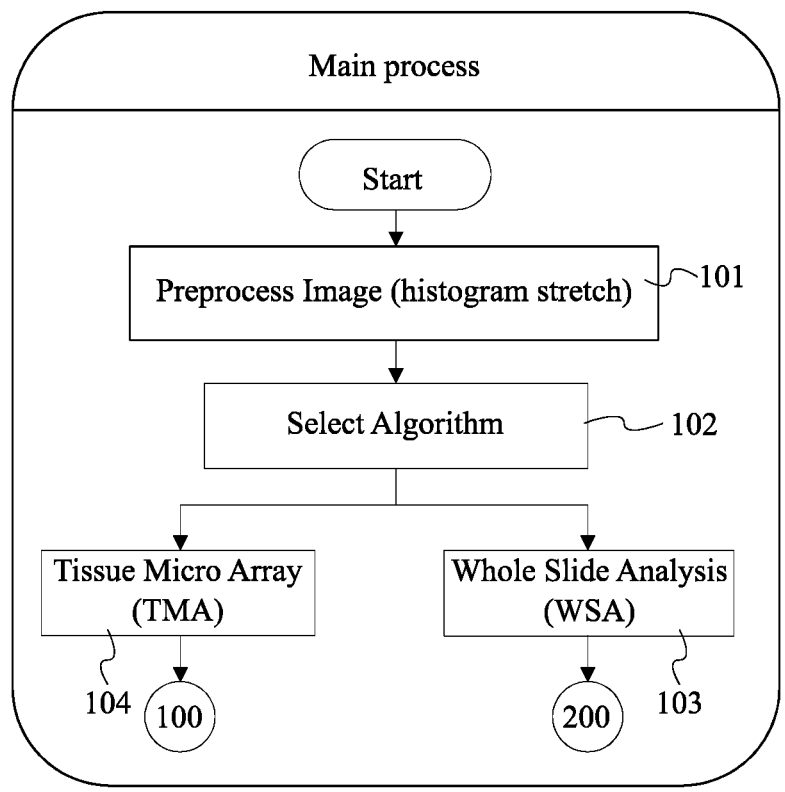
FIG. 8 is a stepwise flow diagram illustrating a general process flow start.

Referring to FIG. 8, first, the input image is preprocessed to enhance the contrast of the image through the histogram stretching process (101). Histogram intensity values of pixels for each channel (Red, Green and Blue) are computed. Mean and standard deviation of intensity values of pixels for each channel (Red, Green and Blue) are computed. Minimum and maximum values are computed for each channel. The index at which the percentage of pixels is less than preset clip percentage threshold is the minimum value. The index at which percentage of pixels is greater than 100 percent clip percentage threshold is the maximum value. If the standard deviations for each channel are less than a preset threshold then there is no need for histogram stretch, else the histogram is stretched for each channel between its minimum and maximum value computed. Pixels with intensity values for red, green and blue channels less than a preset dark artifact threshold are masked as background pixels. The RGB image is converted to a gray scale image. The input slide type is selected as Whole slide analysis (WSA) or Tissue Micro Array (TMA) depending on the input thumbnail image (102).

Figure 9:
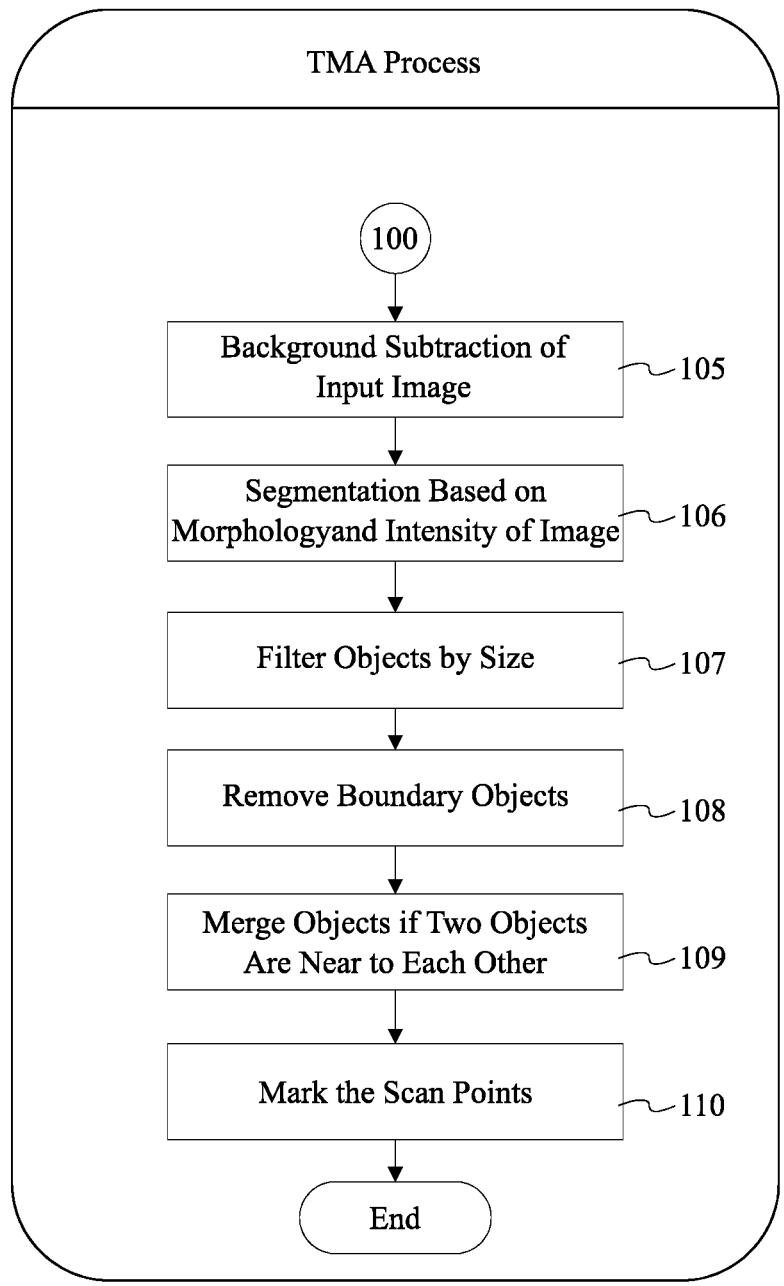
FIG. 9 is a stepwise flow diagram illustrating a TMA process flow.

Referring to FIG. 9, if the input slide type is selected as TMA (104), the input thumbnail image is subtracted from the background image (105). The input image is then segmented based on the morphology and intensity of the image (106). In the segmented image, a filter is applied on size for removing small objects (107). Objects at the boundary of the image are removed (108). Objects with width less than 5 pixels or height less than 5 pixels are removed. It should be noted that 5 pixels by 5 pixels should not be considered to be limiting in terms of the threshold for recognizing small objects. The image is labeled, and objects are merged with each other if they are very close to each other (109). Then, on the TMA thumbnail image, scan points are marked on the tissue area based on the segmentation (110).

Figure 10:
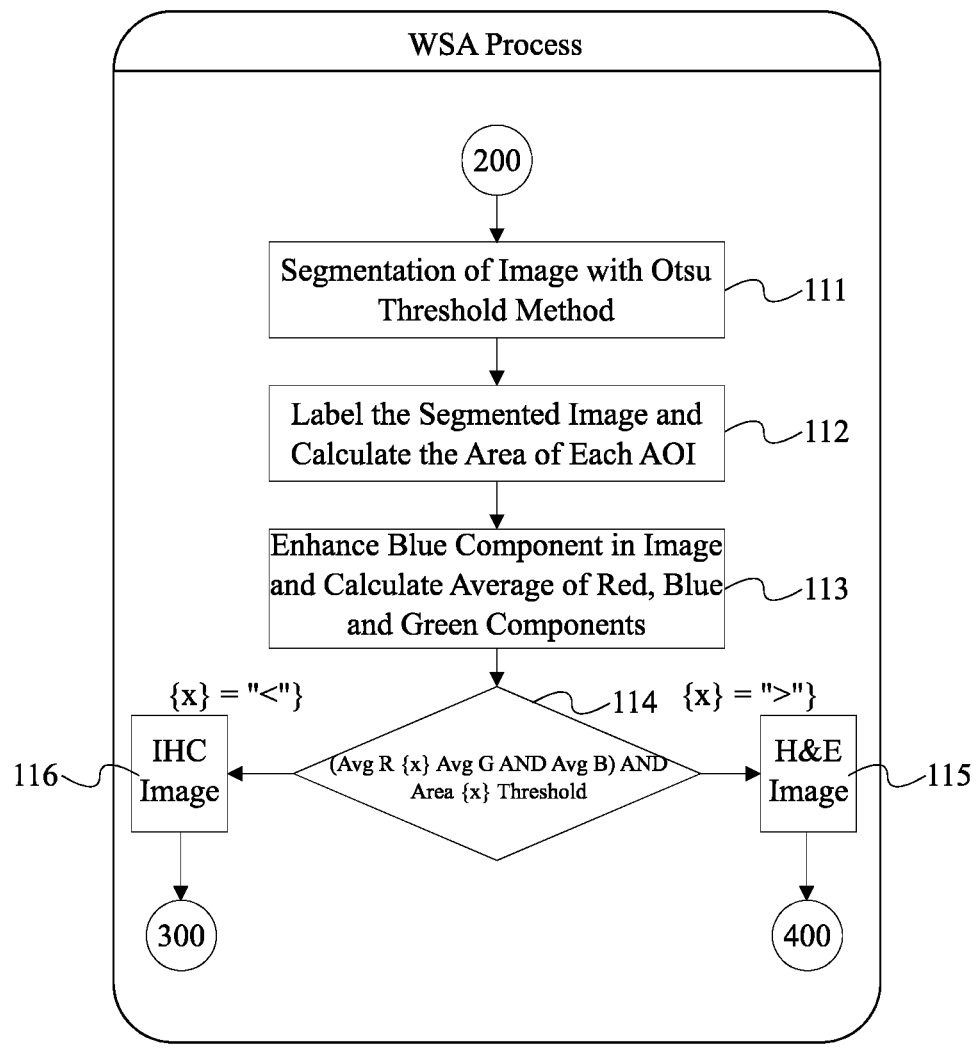
FIG. 10 is a stepwise flow diagram illustrating a WSA process flow.

Referring to FIG. 10, if the input slide type is selected as Whole Slide Analysis (WSA) (103), the staining method is then determined. For classifying the thumbnail as H and E or IHC, segmentation is done with the Otsu threshold method (111). The image is labeled, and the area of each object is computed (112). The blue components in the input image are enhanced, and the average of red, green and blue planes are computed (113). The average of the red component is compared to the average of the green component and the average of the blue component, and the computed object area is compared to a global size threshold (114) The input image is classified as H and E stained if the average of the red component is greater than the average of the green and blue components, and if the computed object area(s) from step is greater than a global size threshold (115). The input image is classified as IHC if the average of the red component is less than the average of the green and blue components and the computed object area(s) is less than global size threshold (116).

Figure 11:
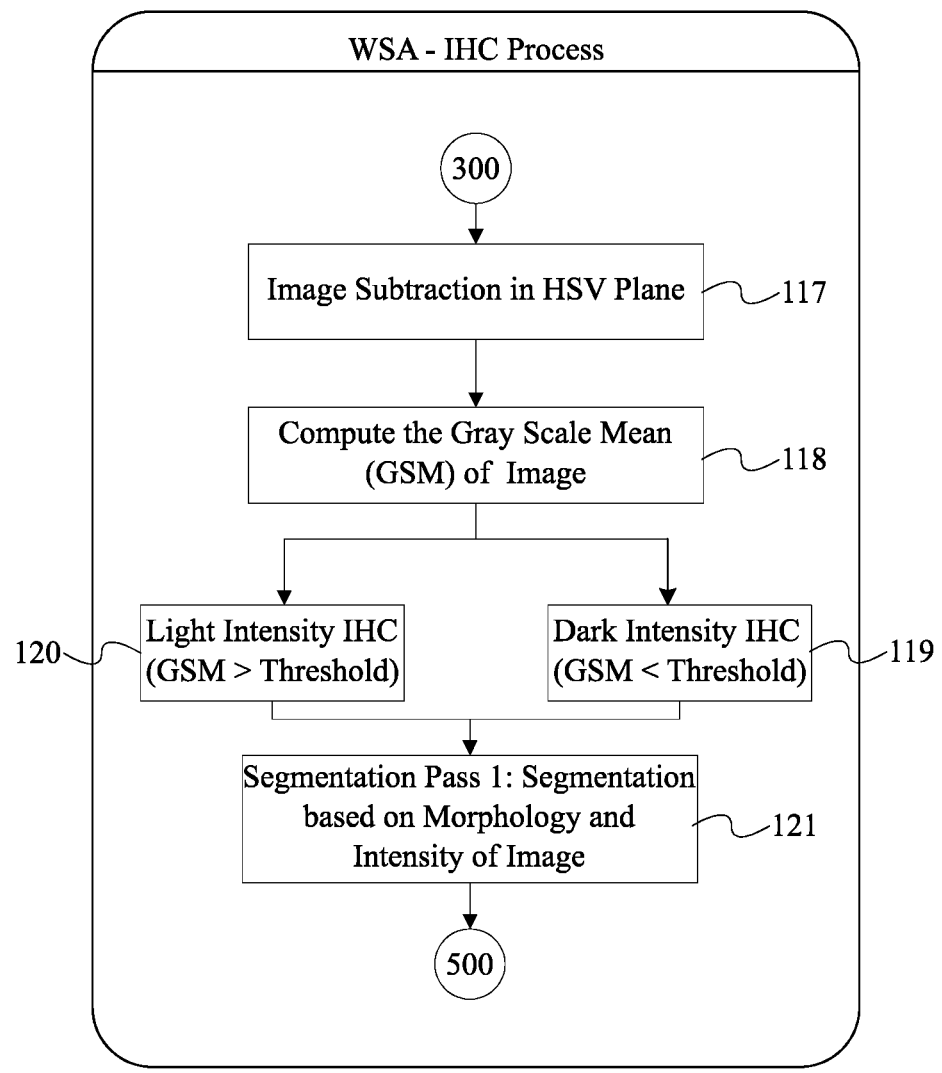
FIG. 11 is a stepwise flow diagram illustrating a WSA-MC process flow.

Referring to FIG. 11, for an IHC stained image in the WSA process flow, the image background is subtracted in the HSV plane (117). The gray scale mean (GSM) of the image is computed (118). The image is classified as a light intensity IHC image if the gray scale mean is greater than a global gray scale threshold (120). The image is classified as a dark intensity IHC image if the gray scale mean is less than the global gray scale threshold (119).

Figure 12:
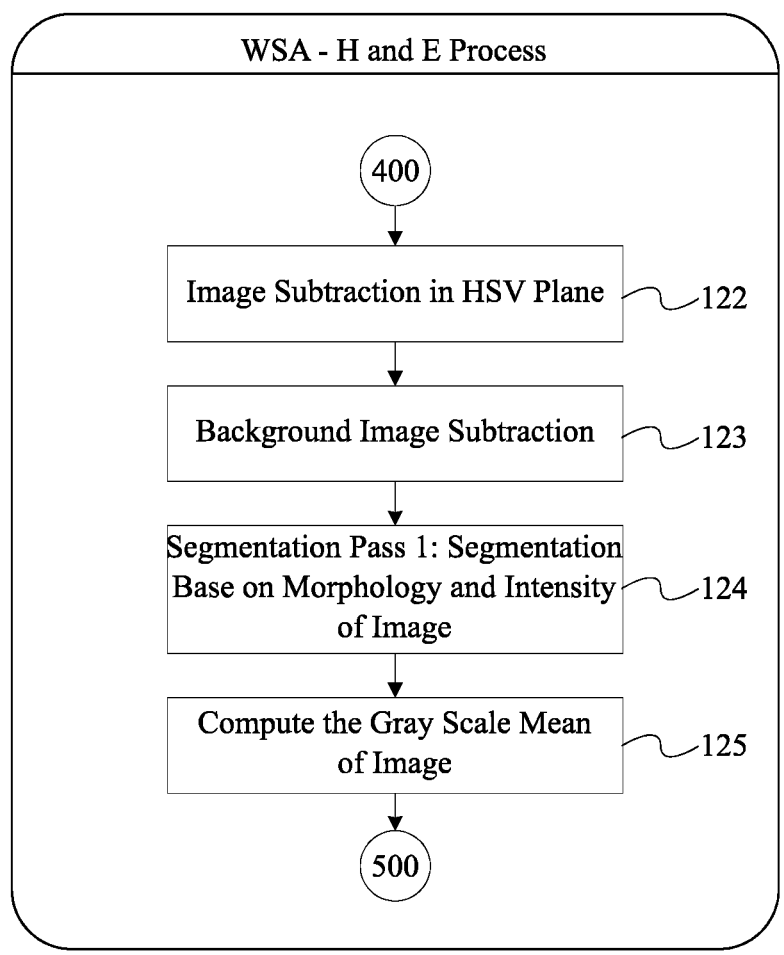
FIG. 12 is a stepwise flow diagram illustrating a WSA-H and E process flow.

Referring to FIG. 12, for an H and E stained image in the WSA process flow, the image is passed through image background subtraction in the HSV plane (122). The image background subtraction process includes a rolling ball mechanism process, interpolation and extrapolation background processes to get the background subtraction. The resultant image undergoes background subtraction process again to get the foreground objects (123). A first pass segmentation process is then executed (124). The first pass segmentation process is based on morphology and intensity of the image. The H and E image is then processed to identify the objects in the image. The Gray scale mean of the image is computed and used in the segmentation as intensity step (125).

Figure 13:
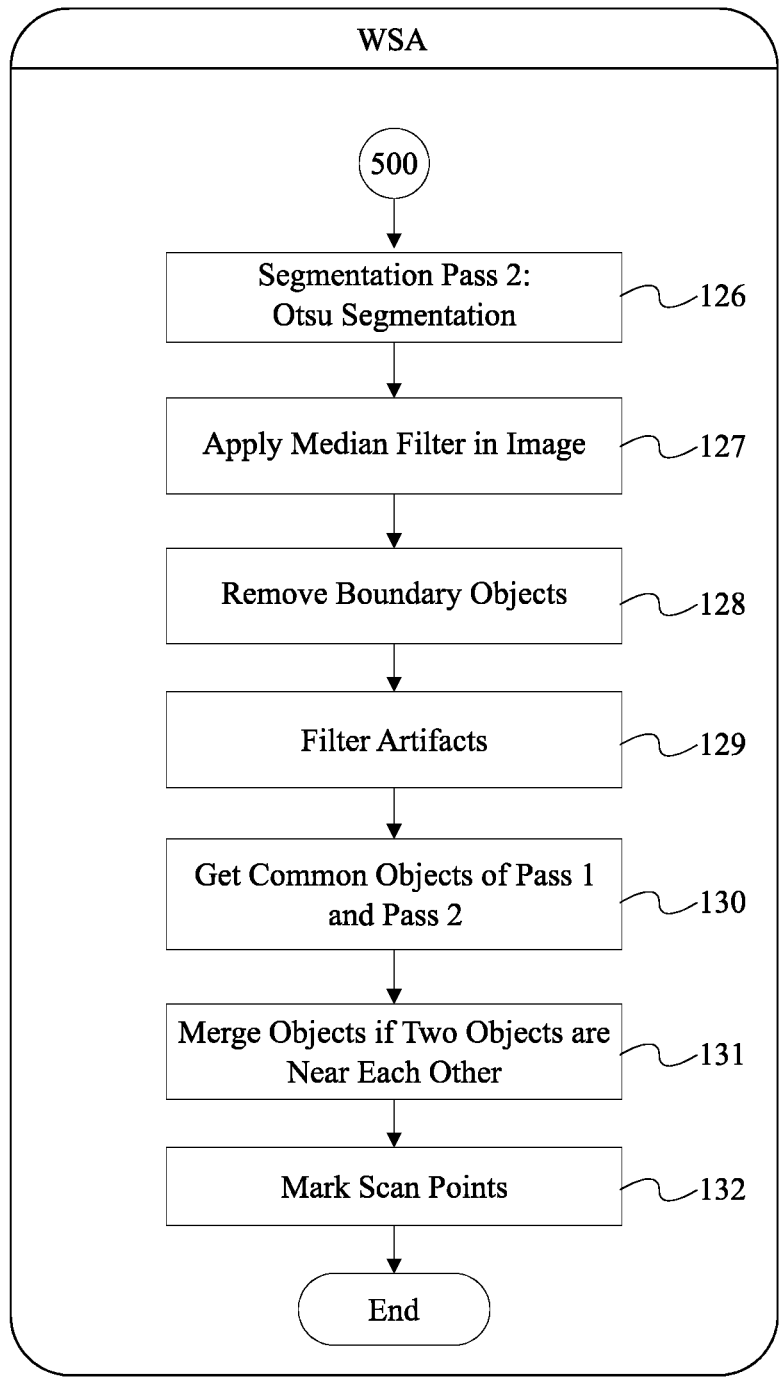
FIG. 13 is a stepwise flow diagram illustrating a final WSA process flow.

Referring to FIG. 13, after either the H and E or IHC-specific processes are executed, the result is passed through a second pass segmentation process (126). Here the segmentation is done by Otsu thresholding method. A median filter is applied in the image to remove noise from image (127). Objects at the boundary of the image are removed based on size of the objects (128). Artifacts are filtered, including filtering some objects whose height to width ratio is very small and are touching the boundary of the image (129). Common objects from the first pass segmentation and the second pass segmentation processes are identified for more accurate segmentation (130). The segmentation-processed image is labeled to get the nearer objects together. The near objects are merged and added to the label image if they are nearer (131). Scan points and regions of interest are marked on the tissue area of H and E or IHC thumbnail image based on the previous processes (132).

Figure 14:
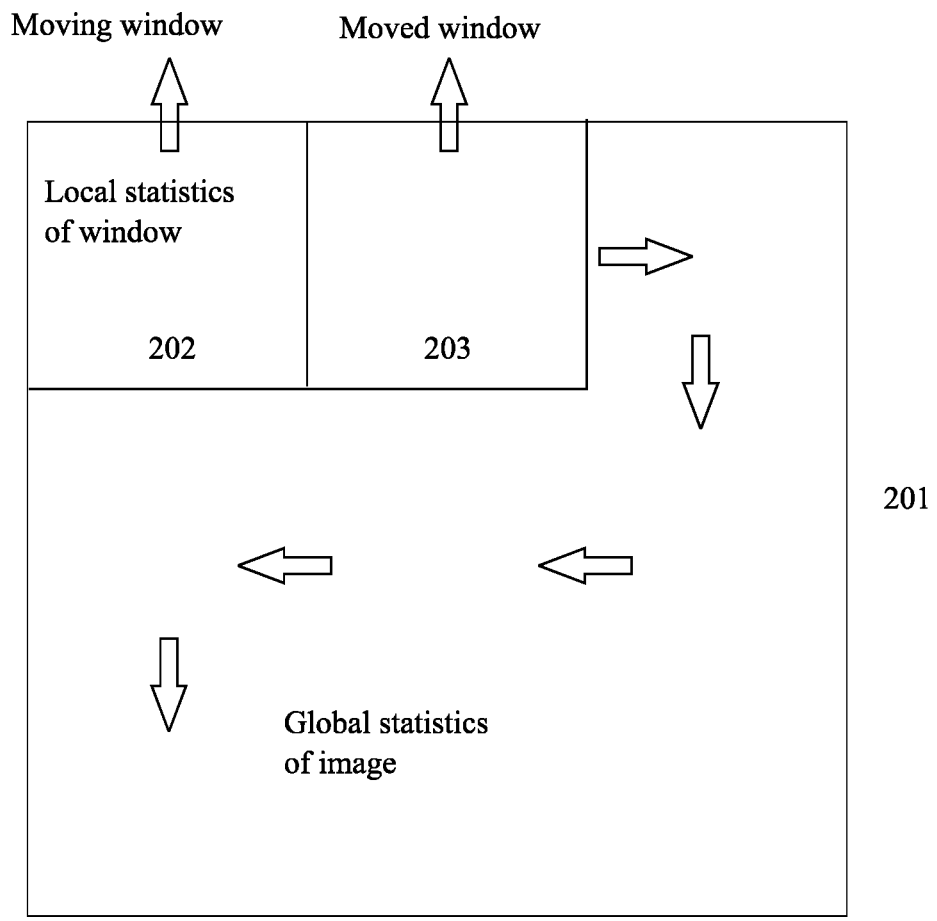
FIG. 14 is an illustration of a moving window based image segmentation technique.

Referring to FIG. 14, a global threshold value for the image is calculated as the mean of threshold values computed by Otsu adaptive threshold method (201). A local threshold is calculated for a local window of a specified size, such as, but not limited to, 64 by 64 pixels, which is the mean of threshold values computed by Otsu method, adaptive threshold method within the local window (202). If the pixel value within the local window is greater than a specified value determined by a formula such as, but not limited to, 0.5*local threshold+0.5*global threshold, then it is a background pixel. The local window is moved over the entire image, local statistics are computed, and segmentation is executed within the local window for each new location of the local window (203).

The following is a further exemplary description of the major features of one preferred embodiment of the present invention, and is not meant to be limiting to the scope of the present invention.

The present invention is a method for automated detection of tissue area done on two types of slides: Tissue Micro Array (TMA) and Whole Slide Analysis (WSA) slides.

The exemplary embodiment of the present invention may further comprise, for detection of tissue area from a thumbnail image of a WSA slide: means for initial preprocessing of image, a software implemented two pass segmentation method means for separating tissue pixels from non-tissue pixels in the image using the combination of global statistics of image with local window statistics for thresholding designed to work for poor quality images, means to remove noise from the segmented image using morphological opening, a software implemented method to group the tissue pixels into tissue areas and classifying the slide into H and E or IHC stained based on the statistics of the segmented tissue areas, and software implemented filters to remove the artifacts based on the stain classification and generate an output result indicating tissue areas on the slide.

The exemplary embodiment of the present invention may further comprise, for detection of tissue area from a thumbnail image of a TMA slide: means for initial preprocessing of image, a software implemented background subtraction of image to get the foreground objects visible; segmentation based on morphology and intensity is implemented to get the objects in the image; removal of artifacts by applying filters on size; merging close objects and marking the scan points on TMA tissue area.

The exemplary embodiment of the present invention may further comprise preprocessing the image, wherein the contrast of the input thumbnail image is enhanced by histogram stretching for R, G and B channels.

The exemplary embodiment of the present invention may further comprise: converting the input (H and E or IHC) image to gray scale and utilizing two pass segmentation techniques to find tissue pixels in the image. In the first pass, segmentation based on morphology and intensity of image is processed. In the second pass, segmentation based on Otsu thresholding is processed. The common objects from the first pass and the second pass are selected for final segmentation of the image. The resultant image is referred for scan points and AOI detection.

The exemplary embodiment of the present invention may further comprise using a combination of global and local thresholds designed to work on poor quality images with uneven illumination and vignetting. Due to uneven illumination, background pixels may be within the intensity range of the foreground pixels. The method also identifies different tissue areas in the same image having large intensity variance, i.e. a tissue area can be very faint as compared to other tissue area in the same slide.

The exemplary embodiment of the present invention may further comprise labeling of the tissue pixels based on neighborhood connection into tissue areas after the morphological opening of segmented image to remove noise.

The exemplary embodiment of the present invention may further comprise a statistical classifier process to classify the image into H and E or IHC stained based on the intensity features of the identified tissue areas.

The exemplary embodiment of the present invention may further comprise selecting appropriate artifact filter thresholds based on the stain type to remove artifacts and get the output of identified tissue regions.

Although the invention has been explained in relation to its preferred embodiment, it is to be understood that many other possible modifications and variations can be made without departing from the spirit and scope of the invention as hereinafter claimed.

What is claimed is:

1. A method of detecting tissue area of interest in digital pathology imaging by executing computer-executable instructions stored on a non-transitory computer-readable medium comprises the steps of:
 providing an input image;
 executing a contrast enhancement process on the input image in order to produce a preprocessed image;
 executing at least one image segmentation process and at least one image filtering process on the preprocessed image in order to identify at least one area of interest (AOI) from the preprocessed image;
 designating at least one scan point of the input image from each of the at least one AOI;
 providing a global gray scale mean (GSM) threshold;

converting the preprocessed image into a gray scale image;

computing a GSM of the preprocessed image;

classifying the preprocessed image as a light intensity Immunohistochemistry (IHC) classification image, if the GSM of the preprocessed image is greater than the global GSM threshold; and classifying the preprocessed image as a dark intensity IHC image, if the GSM of the preprocessed image is less than the global GSM threshold.

2. The method of detecting tissue area of interest in digital pathology imaging by executing computer-executable instructions stored on a non-transitory computer-readable medium as claimed in claim 1 comprises the step of:

executing a first image segmentation process and a second image segmentation process as the at least one image segmentation process.

3. The method of detecting tissue area of interest in digital pathology imaging by executing computer-executable instructions stored on a non-transitory computer-readable medium as claimed in claim 2 comprises the step of:

executing a morphology analysis process and an intensity analysis process as the first image segmentation process.

4. The method of detecting tissue area of interest in digital pathology imaging by executing computer-executable instructions stored on a non-transitory computer-readable medium as claimed in claim 2 comprises the step of:

executing a morphology analysis process and an intensity analysis process as the second image segmentation process.

5. The method of detecting tissue area of interest in digital pathology imaging by executing computer-executable instructions stored on a non-transitory computer-readable medium as claimed in claim 2 comprises the step of:

performing an Otsu threshold segmentation process as the first image segmentation process.

6. The method of detecting tissue area of interest in digital pathology imaging by executing computer-executable instructions stored on a non-transitory computer-readable medium as claimed in claim 2 comprises the step of:

performing an Otsu threshold segmentation process as the second segmentation process.

7. The method of detecting tissue area of interest in digital pathology imaging by executing computer-executable instructions stored on a non-transitory computer-readable medium as claimed in claim 1 comprises the steps of:

selecting a processing algorithm from either a tissue micro array (TMA) analysis or a whole slide analysis (WSA) algorithm based on the input image; and executing the selected processing algorithm in order to identify the at least one AOI from the preprocessed image.

8. The method of detecting tissue area of interest in digital pathology imaging by executing computer-executable instructions stored on a non-transitory computer-readable medium as claimed in claim 7 comprises the steps of:

receiving an algorithm selection through a user interface in order to select the processing algorithm.

9. The method of detecting tissue area of interest in digital pathology imaging by executing computer-executable instructions stored on a non-transitory computer-readable medium as claimed in claim 1 comprises the step of:

executing a histogram stretch process as the contrast enhancement process on the input image in order to produce the preprocessed image.

10. The method of detecting tissue area of interest in digital pathology imaging by executing computer-executable instructions stored on a non-transitory computer-readable medium as claimed in claim 1 comprises the steps of:

providing a clip percentage threshold and a dark artifact threshold;

computing a histogram intensity value for each of a red color channel, a blue color channel, and a green color channel for each pixel of the input image;

computing a standard deviation of the histogram intensity value for each of the red color channel, the blue color channel, and the green color channel for each pixel of the input image;

comparing the standard deviation of the histogram intensity values for each of the red color channel, the blue color channel, and the green color channel to the clip percentage threshold;

analyzing the input image to identify background pixels, wherein the background pixels have histogram intensity values in the red color channel, the blue color channel, and the green color channel less than the dark artifact threshold; and removing the background pixels from the input image, if the standard deviations of the histogram intensity values of the background pixels are less than the clip percentage threshold.

11. The method of detecting tissue area of interest in digital pathology imaging by executing computer-executable instructions stored on a non-transitory computer-readable medium as claimed in claim 1 comprises the steps of:

identifying at least one background area from the preprocessed image; and subtracting the at least one background area from the preprocessed image as one of the at least one image filtering process.

12. The method of detecting tissue area of interest in digital pathology imaging by executing computer-executable instructions stored on a non-transitory computer-readable medium as claimed in claim 1 comprises the steps of:

analyzing the preprocessed image in order to identify a plurality of neighboring objects from the preprocessed image, wherein each of the plurality of neighboring objects is within a specified pixel distance of each other in the preprocessed image; and merging the plurality of neighboring objects into a grouped object as one of the at least one image filtering process.

13. The method of detecting tissue area of interest in digital pathology imaging by executing computer-executable instructions stored on a non-transitory computer-readable medium as claimed in claim 1 comprises the steps of:

analyzing the preprocessed image in order to identify at least one small object from the preprocessed image, wherein each of the at least one small object traverses less than a specified pixel threshold in the preprocessed image; and removing each of the at least one small object from the preprocessed image as one of the at least one image filtering process.

14. The method of detecting tissue area of interest in digital pathology imaging by executing computer-executable instructions stored on a non-transitory computer-readable medium as claimed in claim 1 comprises the steps of:

analyzing the preprocessed image in order to identify at least one boundary object from the preprocessed image; and removing each of the at least one boundary object from the preprocessed image as one of the at least one image filtering process.

15. The method of detecting tissue area of interest in digital pathology imaging by executing computer-executable instructions stored on a non-transitory computer-readable medium as claimed in claim 1 comprises the steps of:

providing a global object area threshold;

analyzing the preprocessed image in order to identify a plurality of objects;

computing an area for each of the plurality of objects;

increasing an intensity of a blue color channel from the input image;

computing an average intensity for each of the blue color channel, a red color channel, and a green color channel from the input image;

comparing the average intensity of the blue color channel to the average intensity of the red color channel and the average intensity of the green color channel;

assigning a Hematoxylin and Eosin (H and E) classification to the input image, if the average intensity of the red color channel is greater than the average intensity of the green color channel and the average intensity of the blue color channel, and if the area of each of the plurality of objects is greater than the global object area threshold; and assigning an Immunohistochemistry (IHC) classification to the input image, if the average intensity of the red color channel is less than the average intensity of the green color channel and the average intensity of the blue color channel, and if the area of each of the plurality of objects is less than the global object area threshold.

* * * * *